United States Patent
Bora et al.

(10) Patent No.: US 11,796,053 B2
(45) Date of Patent: Oct. 24, 2023

(54) METHOD FOR CONTROLLING A TRANSMISSION OF A VEHICLE

(71) Applicant: VOLVO TRUCK CORPORATION, Gothenburg (SE)

(72) Inventors: Teodoro Bora, Gothenburg (SE); Johan Fries, Gråbo (SE); Viktor Lägnert, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/776,619

(22) PCT Filed: Nov. 13, 2019

(86) PCT No.: PCT/EP2019/081200
§ 371 (c)(1),
(2) Date: May 13, 2022

(87) PCT Pub. No.: WO2021/093948
PCT Pub. Date: May 20, 2021

(65) Prior Publication Data
US 2022/0403928 A1     Dec. 22, 2022

(51) Int. Cl.
*F16H 61/02*     (2006.01)
*F16H 59/14*     (2006.01)
(Continued)

(52) U.S. Cl.
CPC ... *F16H 61/0213* (2013.01); *F16H 2059/144* (2013.01); *F16H 2059/663* (2013.01);
(Continued)

(58) Field of Classification Search
CPC ......... F16H 61/0213; F16H 2059/144; F16H 2059/663; F16H 59/66; F16H 2061/0015;
(Continued)

(56) References Cited

U.S. PATENT DOCUMENTS

2006/0089774 A1    4/2006   Steen et al.
2006/0293822 A1    12/2006   Lattemann et al.
(Continued)

FOREIGN PATENT DOCUMENTS

CN     103124868 A     5/2013
CN     106763724 A     5/2017
(Continued)

OTHER PUBLICATIONS

International Search Report and Written Opinion of the International Searching Authority, PCT/EP2019/081200, dated Jul. 21, 2020, 13 pages.

(Continued)

*Primary Examiner* — Edwin A Young
(74) *Attorney, Agent, or Firm* — Sage Patent Group (57) ABSTRACT

Methods for controlling a transmission of a vehicle are provided. Such methods include
    establishing a desired speed profile for the vehicle when travelling along a road segment,
    performing a plurality of simulations, each of a vehicle response, in the road segment, to a respective gear control action, wherein the gear control action differs from one simulation to another, wherein the simulations include an aim to keep the speed on the speed profile, or within one or more established limits of deviations from the speed profile,
    determining costs for the simulated vehicle responses,
    selecting, in dependence on the determined costs, one of the gear control actions,
    controlling the transmission with the selected gear control action.

22 Claims, 8 Drawing Sheets

(51) Int. Cl.
*F16H 59/66* (2006.01)
*F16H 61/00* (2006.01)

(52) U.S. Cl.
CPC ............. *F16H 2061/0015* (2013.01); *F16H 2061/022* (2013.01); *F16H 2061/0223* (2013.01); *F16H 2061/0227* (2013.01)

(58) Field of Classification Search
CPC ....... F16H 2061/022; F16H 2061/0223; F16H 2061/0227
See application file for complete search history.

(56) References Cited

U.S. PATENT DOCUMENTS

| | | | |
|---|---|---|---|
| 2008/0027612 A1 | 7/2008 | Eriksson et al. | |
| 2013/0253782 A1 | 9/2013 | Saltsman et al. | |
| 2014/0277835 A1* | 9/2014 | Filev | G06F 17/00 701/2 |
| 2015/0321670 A1* | 11/2015 | Johansson | B60W 30/143 701/94 |
| 2015/0330502 A1* | 11/2015 | Johansson | B60W 40/076 701/55 |
| 2015/0362065 A1* | 12/2015 | Johansson | F16H 59/44 701/65 |
| 2016/0214606 A1* | 7/2016 | Roos | B60W 10/06 |
| 2020/0346659 A1* | 11/2020 | Düser | B60W 30/18072 |

FOREIGN PATENT DOCUMENTS

| | | |
|---|---|---|
| CN | 108506474 A | 9/2018 |
| WO | WO 2014/003655 A1 | 1/2014 |
| WO | 2019001372 A1 | 1/2019 |

OTHER PUBLICATIONS

Fu, J., et al., "Gear Shift Optimization For Off-Road Construction Vehicles," EJTIR, Issue 14(3), 2014, pp. 214-228.
First Office Action for Chinese Patent Application No. 201980102124.1, dated Feb. 25, 2023, 3 pages.
Search Report for Chinese Patent Application No. 201980102124.1, dated Feb. 25, 2023, 3 pages.

* cited by examiner

METHOD FOR CONTROLLING A TRANSMISSION OF A VEHICLE

CROSS REFERENCE TO RELATED APPLICATIONS

This application is a 35 U.S.C. § 371 national stage application of PCT International Application No. PCT/EP2019/081200 filed on Nov. 13, 2019, the disclosure and content of which is incorporated by reference herein in its entirety.

TECHNICAL FIELD

The invention relates to a method for controlling a transmission of a vehicle. The invention also relates to a computer program, a computer readable medium, a control unit, and a vehicle.

The invention can be applied in heavy-duty vehicles, such as road trucks, quarry trucks, mining trucks, and buses. The invention is not restricted to heavy-duty vehicles, but may also be used for other vehicles such as cars.

BACKGROUND

There is a desire to improve the gear selection strategies for vehicles, in particular heavy duty vehicles such as trucks or buses. Thereby, the vehicle operation may be more efficient, e.g. by saving fuel, reducing components ageing and/or improving safety.

US20060293822 discloses a method for controlling an automatic transmission in a vehicle, to avoid unnecessary gear changes on routes with rapidly changing topography, and to improve the performance of the vehicle transmission on downhill road segments, in terms of fuel economy, wear on the transmission and brakes, and operator comfort. A vehicle simulation device uses information regarding current vehicle operating parameters, together with map information regarding a route being traveled by the vehicle, to project the dynamic longitudinal behavior of the vehicle, including vehicle velocity for the road that lies ahead. The map information includes information on the road gradient for the route forward of the vehicle. An evaluation module utilizes speed profile information generated in this manner to develop a desired torque. A shift strategy module converts the desired torque into a desired gear and a point in time for shifting, such that the transmission either shifts into neutral or shifts to an appropriate gear.

There is nevertheless a desire to further improve the gear selection strategies for vehicles.

SUMMARY

An object of the invention is to improve gear selection strategies for vehicles. It is a further object of the invention to provide a gear selection strategy that will make a vehicle operation more efficient.

The objects are reached with a method according to claim 1. Thus, the objects are reached with a method for controlling a transmission of a vehicle, the method comprising
  establishing a desired speed profile for the vehicle when travelling along a road segment,
  performing a plurality of simulations, each of a vehicle response, in the road segment, to a respective gear control action, wherein the gear control action differs from one simulation to another, wherein the simulations include an aim to keep the speed on the speed profile, or within one or more established limits of deviations from the speed profile,
  determining costs for the simulated vehicle responses,
  selecting, in dependence on the determined costs, one of the gear control actions,
  controlling the transmission with the selected gear control action.

The controlling of the transmission may involve selecting a gear of the transmission.

The invention provides an advantageous way of establishing a gear strategy, where a speed profile needs to be closely followed. The speed profile may be provided as a series, or a continuous function, of absolute speed values. Where the method is carried out onboard the vehicle, establishing the speed profile may comprise receiving the speed profile, e.g. from a remote source. The speed profile for the road segment may be a part of a speed profile for a route to be travelled by the vehicle, including the road segment. Thereby, establishing the speed profile for the road segment may comprise receiving the speed profile for the route, e.g. from a remote source, and extracting the speed profile for the road segment, from the speed profile for the route. The speed profile for the route may be established e.g. by recording the speed profile during a previous trip of the vehicle, or another vehicle, along the route. In some embodiments, the speed profile for the route may be determined by mathematically modelling the vehicle speed along the route, e.g. in dependence of vehicle characteristics and data on the route.

The plurality of simulations are herein also referred to as a set of simulations. The simulations are preferably performed subsequently to the speed profile establishment. A vehicle response is understood as a response of the vehicle to the respective gear control action. The simulations may include a condition to keep the speed on the speed profile, or within one or more established speed profile deviations limits.

Determining costs for the simulated vehicle responses may involve calculating a cost for each simulated vehicle response. Embodiments of the invention may comprise selecting the gearshift of the simulation showing the lowest cost. The selected gear control action may be the gear control action of the vehicle response having the lowest cost.

The vehicle may have any suitable type of drivetrain. For example, the vehicle may comprise an internal combustion engine, wherein the transmission is provided between the engine and driving wheels of the vehicle. In some applications, the drivetrain may include an electric hybrid propulsion arrangement. In other application, the vehicle may be an electric vehicle.

The method may comprise determining operational conditions of the vehicle. The operational conditions may comprise values of one or more operational parameters. The operational parameters may comprise one or more of the vehicle speed, the speed of an internal combustion engine of the vehicle, the speed of an electric propulsion motor of the vehicle, the state of charge of a battery pack of the vehicle, and the ambient temperature. The simulations may be performed in dependence on the operational conditions of the vehicle.

The vehicle response simulations, the cost determinations, and the gear control action selection may form parts of a gear selection strategy. The plurality of simulations will provide a thorough review of options available to the vehicle control, while aiming to follow the speed profile. Therefore, the vehicle response simulations based on gear control actions, and the gear control action selection will improve a gear selection strategy of the vehicle.

The road segment may be provided e.g. by dividing a road to be travelled into a plurality of segments. As exemplified below, the road segments may be overlapping. The road segment may be selected while the vehicle is travelling. In some embodiments, the road segment may be provided by establishing a segment of the road at a limited distance in front of the vehicle. Thereby, the invention may be provided to select a gear control action, based on the speed profile and the road, within a horizon of time or distance. The horizon of time or distance may be in the near future. Thereby, an optimized gear selection strategy for a limited road segment may be provided. Embodiments of the invention may be seen as a low level decision making process, providing the best gear for a current, or near future, situation. The relatively short horizon may provide for the simulations to be done by a control unit onboard the vehicle, without requiring excessive amounts of computational capacity.

The speed profile may comprise one or more speed transitions. Thereby, the method may advantageously allow for keeping the speed on the speed profile, or within the one or more speed profile deviation limits, throughout one or more speed transitions.

Preferably, the steps of performing a plurality of simulations, determining costs for the simulated vehicle responses, and selecting one of the gear control actions, are done onboard the vehicle, while the vehicle is travelling. Thereby, where the simulations are done in dependence on operational conditions of the vehicle, the operational conditions are readily available for the simulations. This means that any change in the operational conditions can be taken into account for a series of sets of simulations, without any substantial delay, e.g. caused by data transmissions between the vehicle and a remote resource. Thereby, propagation of errors, e.g. due to imperfections in a mathematical vehicle model for the simulations, measurement noises, and/or an unexpected event such one or more spinning wheels, may be reduced, minimized or eliminated. Further, by the onboard simulations and cost determinations may provide a robust solution, e.g. since the risk of delays, or data corruption, at vehicle external communication, is avoided.

Preferably, the steps of performing a plurality of simulations, and determining costs for the simulated vehicle responses, are repeated a plurality of times while the vehicle is travelling. Thereby, operational conditions, in dependence on which the simulations are performed, may be updated from one set of simulations to another. Such a repetition, in particular combined with relatively short road segments, will keep the computational capacity requirements low, while providing a solid basis for the gear selection strategy. In some embodiments, said steps could be repeated within a predetermined time interval, e.g. of 0.1-10 seconds, preferably, 0.1-2.0 seconds. Alternatively, said steps could be repeated within a predetermined distance of travelling of the vehicle.

Preferably, also the step of selecting one of the gear control actions, is repeated a plurality of times while the vehicle is travelling. The step of selecting one of the gear control actions may be done with the same frequency as the steps of performing the simulations, and determining the costs for the vehicle responses. However, in some embodiments, the steps of performing the simulations, and determining the costs for the vehicle responses, may be repeated one or more times before the step of selecting one of the gear control actions. Thereby, the selection of one of the gear control actions may be done from a plurality of sets of simulations. Thereby, a better basis for the selection may be obtained. For example, the operational conditions may have changed between two sets of simulations. Thereby, a second simulation set may provide vehicle responses based on more accurate information on the conditions.

Preferably, also the step of controlling the transmission with the selected gear control action, is repeated a plurality of times while the vehicle is travelling. The step of controlling the transmission with the selected gear control action may be done with the same frequency as the step of selecting one of the gear control actions.

However, in some embodiments, the step of selecting one of the gear control actions, may be repeated one or more times before the step of controlling the transmission with the selected gear control action. Thereby, the repeat of the selection of a gear control action selection may provide the selection of a more beneficial gear control action, e.g. due to changing operational circumstances.

As exemplified below, information on environmental conditions, such as road inclination, of the road segment, could be included in preview data, in dependence of which the simulations are performed.

Preferably, all of said simulations are simulations of vehicle responses at the same location of the road segment. Thus, all simulations of a set of simulations are simulations of vehicle responses at the same location of the road segment. For example, all simulations in a set of simulations could simulate vehicle responses initiated at the same position along the road segment, e.g. at the beginning of the road segment. The length of the road segment could be chosen such that the vehicle responses begin at the beginning of the road segment, and end at the end of the road segment. This may be combined with a repetition of the simulations, the cost determinations, and the gear control action selection, in consecutive road segments.

A gear control action of a simulation may occur at the beginning of the simulation. Alternatively, the simulation may include a simulation of the vehicle behavior before the gear control action. Thus, the simulation may simulate the vehicle behavior before, and during, the gear control action. The simulation may in addition simulate the vehicle behavior after the gear control action.

As suggested, consecutive road segments may be overlapping. However, in some embodiments, consecutive road segments may be adjacent. In both alternatives, the method will provide a gear selection strategy covering all of the road, or a stretch thereof, traveled by the vehicle.

Preferably, the vehicle responses of the simulations include at least one of a vehicle speed, a vehicle acceleration, and a torque of the vehicle. The torque may be a propulsive torque. The torque may be a retardation torque. The torque could be a torque of a drivetrain of the vehicle. The vehicle responses may include engine braking. The method may be used for a gear selection during engine braking. The acceleration could be positive or negative.

For example, a torque response may be determined in dependence on a gear control action, e.g. including a gearshift. In dependence of the torque response, the vehicle acceleration and the vehicle speed may be determined. The acceleration may be dependent of the vehicle mass and/or the road inclination. The road inclination can be provided from map data and/or vehicle mass and torque data. Thereupon the speed may be compared to the speed profile. A further torque response may be determined, in the dependence on a deviation of the speed from the speed profile. A further acceleration in dependence the further torque response may be determined, and a further speed may be compared with the speed profile. Thereby, a stepwise determination of the vehicle response through the road segment may be provided. Thereby, it may be secured that the speed profile is followed closely.

In some examples, a simulation may include both propulsive torque and retardation torque. For example, when the road segment includes a first part with a zero inclination, or relatively low, e.g. downhill, inclination, and a second part, following upon the first part, with a relatively high downhill inclination. Thereby, there may be propulsive torque before the second part, and a retardation torque in the second part. Thereby, a selected gear control action may be a downshift before the second part. Thereby, the usage of service brakes may be avoided. However, in some examples, the vehicle responses of the simulations may include service brake torque.

Preferably, the gear control action of at least one of the simulations is a gearshift from a current gear to another gear. The gear control action of a plurality of the simulations may be a gearshift from a current gear to another gear, wherein the other gear in the gearshift differs from one simulation to another. Preferably, the gear control action of one of the simulations is remaining in the current gear. Thereby, the vehicle response simulations may include all possible gears within a range, including the current gear. Thereby an exhaustive investigation of a plurality of possibilities for the gear selection strategy may be provided. Thereby, a solid base is provided for the gear control action selection. However, in some embodiments, all simulations could be of a respective vehicle response to a gearshift.

In some embodiments, the gear control action of one or more of the simulations is a gearshift from a current gear to another gear, followed by a further gearshift from the other gear to a further gear. Thus, one or more of the gear control actions may comprise two gearshifts. For example, a gear control action could comprise upshifting one or more gear steps, followed by a further upshift of one or more gear steps. It is conceivable that one or more of the gear control actions comprise three gearshifts. Including such gear control actions in the simulations may further improve the basis for the gear control action selection.

Where the vehicle comprises an internal combustion engine, the method may comprise establishing a minimum speed of the engine, and removing, from the gear control action selection, or deselecting, a gear control action comprising a gearshift to a gear providing an engine speed below the minimum speed. Removing a gear control action from the gear control action selection, may be done by avoiding a simulation with the gear control action. Alternatively, the vehicle response to the gear control action could be simulated, and thereafter the simulation could be removed from the selection. Establishing a minimum speed of the engine may comprise establishing the minimum engine speed for one or more gears, in a steady-state operation of the engine. By removing a gearshift to a gear with an engine speed below the minimum engine speed, oscillation and/or shaking of a driveline of the vehicle may be avoided. The minimum engine speed may depend on the road inclination, and/or the vehicle mass.

In some embodiments, where the vehicle response of a simulation involves an engine speed below the minimum engine speed, the cost for the response may be relatively high due to the engine speed being below the minimum engine speed. Thereby, in the gear control action selection, the gear control action of such a simulation may be deselected due to the relatively high cost of the vehicle response.

Preferably, the cost for each simulated vehicle response is dependent on one or more operational parameters selected from the group of fuel consumption of the vehicle, a deviation from the speed profile, a vehicle service brake usage, an engine retarder usage, and a driveline retarder usage. Thus, the cost for each simulated vehicle response may be based on the operational parameter(s). The cost determination may include determining a plurality of values of the operational parameters of at least some of the operational parameters, along the road segment. The parameter values may be determined, in parallel with, in conjunction with, or following, the simulations. The cost determination may include integrating at least some of the operational parameters over the road segment. The costs of the vehicle responses may be determined by means of a cost function. Each cost may allow for determining a quality of the respective gear control action.

Alternatively, or in addition, the one or more operational parameters, on which each vehicle response cost is dependent, may include the speed of an internal combustion engine of the vehicle. Thereby, an engine speed above a desired engine speed range, a may have a higher contribution to the cost, compared to an engine speed within the desired engine speed range. Similarly, an engine speed below the desired engine speed range, a may have a higher contribution to the cost, compared to an engine speed within the desired engine speed range.

Where the vehicle is an electric hybrid vehicle, or an electric vehicle, the one or more operational parameters, on which each vehicle response cost is dependent, may include the energy recovery of the vehicle drivetrain.

In some examples, the fuel consumption may be minimized by shifting to a gear providing an engine speed that is as low as possible. The fuel consumption may be determined in dependence on an engine efficiency map. In some example, depending on the efficiency map, and the road inclination and/or the vehicle mass, shifting to a hinger gear may increase the fuel consumption. Thereby, a vehicle response with a gearshift to a higher gear may have a higher cost that a vehicle response to no gearshift.

Preferably, the respective response cost is determined by weighting respective values of the operational parameters. Thereby, the cost may be a balance between the different operational parameters. The operational parameters may be normalized. The parameters may be normalized against a best and a worst case for the respective parameters. The normalized values of the parameters may be used for the weighting. A gear control action may be selected, which minimizes a weighted sum of the operational parameters.

As suggested, in some embodiments the method comprises, before controlling the transmission with the selected gear control action, repeating one, more, or all, of the simulations of vehicle responses to the respective gear control actions. Thereby, the reliability of the simulation results may be improved. This may secure that the gear control action with the lowest cost is selected. Further, it may reduce the chance of a different gear control action being selected upon a subsequent set of simulations, and cost determinations.

In some embodiments, the gear control action selection is frozen until the transmission has been controlled with the selected gear control action. Thereby, any subsequently selected, different gear control action, may be ignored, i.e. left without being used for the transmission control. This may eliminate the chance of a different gear control action being used for the transmission control upon a subsequent set of simulations, and cost determinations. However, in some embodiments, the frozen gear control action may be un-frozen, if a subsequent selection of a gear control action, occurring before the transmission control according to the frozen gear control action selection, involves remaining in the current gear. Thereby, the transmission may be controlled according to the subsequently selected gear control action.

Preferably, the method comprises establishing one or more limits of deviations from the speed profile, wherein the simulations include an aim to keep the speed within the one or more established deviation limits. Thereby, the vehicle speed of the simulations may be kept to follow the speed profile, within a tolerance range given by the speed profile deviation limits.

For each speed of the speed profile, there could be an upper deviation limit, above the speed. For each speed of the speed profile, there could be lower deviation limit, below the speed. Where the speed profile forms a continuous function of the distance along the road segment, deviation limits could form a continuous function of the distance, above or below the speed profile continuous function.

The deviations limits could be close enough to the speed profile, so as for the vehicle to travel at speeds, which, at least on average, as the vehicle moves along the road segment, are relatively close to the speed profile. The deviations limits could be far enough away from the speed profile, so as to allow deviations required by the gear control actions in the environmental conditions presented by the road segment. The environmental conditions presented by the road segment could include, for example, the road inclination and/or the road curvature. Thereby, simulations of several gears control actions may be allowed. Upper and lower deviation limits may provide limits within which the actual speed of the vehicle can oscillate around the speed profile. Thereby, any uncertainties in the simulations may be handled.

The deviation limits may also allow for avoiding an excessive number of gearshifts, which may otherwise occur in a control with an aim to keep the actual speed at, or very close to, the speed profile. For example, some gearshifts may improve the vehicle response in speed transient phases to some degree, but the gear which they lead to may be sustainable for only a relatively short time. Therefore, the overall cost might be lower by avoiding some gearshifts at some speed transient phases. Nevertheless, as suggested, the deviation from the speed profile could be an operational parameter affecting the cost of a simulated vehicle response.

The one or more deviation limits may be further from the speed profile at a speed transition, than at a constant speed. Thus, larger deviations may be allowed during speed transitions than at constant speeds. Thereby, the deviation limits may allow for response delays, of a control system performing an embodiment of the method, to occur, without the limits being exceeded.

Preferably, the method comprises establishing preview data of the road segment, the simulations being performed in dependence on the preview data. Thereby, the gear selection strategy may be improved. The preview data could include road inclination. At flat conditions, or moderate uphill conditions, depending on vehicle mass, a relatively high gear may be preferable, because it reduces the engine speed, and thereby the fuel consumption may be relatively low. If there is an upcoming change in the demanded speed, it may be desirable to select a gear, adapted for the changed speed, at an early stage, to provide a proper engine response, e.g. for a positive acceleration or engine braking, before the transient phase and not during it. Shifting gears during an acceleration or a retardation may disrupt the vehicle speed, because the driveline is disengaged for a while, and torque needs to be built up when the driveline is engaged again. For the same reason, it may be desirable to select a proper gear for an uphill road section, or for a downhill road section, before the section is reached. Having a gear adapted for a downhill section, before the section is reached, may reduce, or eliminate, the usage of services brakes or a retarder.

Thus, the preview data gives the gear control action selection a possibility to predict conditions ahead in time, and makes it possible to provide a gear selection strategy that increases the efficiency of the vehicle operation.

The preview data could include environmental conditions of the road segment, such as the road inclination. Where the method is carried out onboard the vehicle, establishing the preview data may comprise receiving the preview data, e.g. from a remote source. The preview data may include map data including characteristics of the road, such as inclinations and curves along the road. The received preview data may be processed before being used for the simulations. Thus, in some embodiments, the method comprises establishing an inclination of the road segment, and a desired speed profile for the road segment. The simulations may be done by means of a mathematical model of the vehicle. The simulations may be done in dependence of the preview data, and the speed profile. As suggested, the simulations may further be done in dependence on minimum engine speeds, and/or deviation limits from the speed profile.

In some embodiments, the speed profile may be established for a route to be travelled by the vehicle, including the road, or a portion thereof. Thereby, establishing a desired speed profile for the vehicle when travelling along the road segment, may comprise extracting a portion of the speed profile for the route.

The preview data may be repetitively updated as the vehicle travels. Sequential sets of preview data could be provided for the repeated sets of simulations. Each set of preview data may include information on environmental conditions of a respective road segment. Thus, a sequence of road segments may provide information, in dependence on which a sequence of sets of simulations are performed. The road segments may be overlapping, or follow one adjacent to the next one. However, in the repeated sets of simulations, preferably all simulations in a single set of simulations, are preferably done in dependence on the same set of preview data. Thus, in the repeated sets of simulations, preferably all simulations in a single set of simulations, are preferably done in dependence on information about the same road segment.

The sets of simulations may be performed with a frequency which is the same as the frequency of preview data sets. However, in some embodiments, the sets of simulations may be performed with a frequency which is different from the frequency of preview data sets. Thereby, a set of simulations may be performed in dependence on the most recent preview data set.

Preferably, one or more of the simulations comprise determining vehicle dynamics during a gearshift of the respective gear control action. The vehicle dynamics may comprise a time duration during the gearshift, in which there is no propulsive torque in the vehicle. The vehicle dynamics may provide, in dependence on the road inclination, a vehicle deceleration due to the gearshift. For example, the deceleration may be determined in dependence on the time duration of no propulsive torque, and the road inclination. Thereby, an improved basis for the gear control action simulation is provided. For example, if the deceleration is relatively large, the gear control action may not be selected, due to a speed deviation parameter contributing to a high cost of the simulated vehicle response. In addition, a subsequent acceleration up to the speed profile being relatively slow, e.g. due to a relatively high gear resulting from the gearshift, a further increase of the simulated vehicle response cost may follow.

Preferably, the method is computer implemented. The objects are also reached with a computer program according to claim 19, a computer readable medium according to claim 20, a control unit according to claim 21, or a vehicle according to claim 22.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
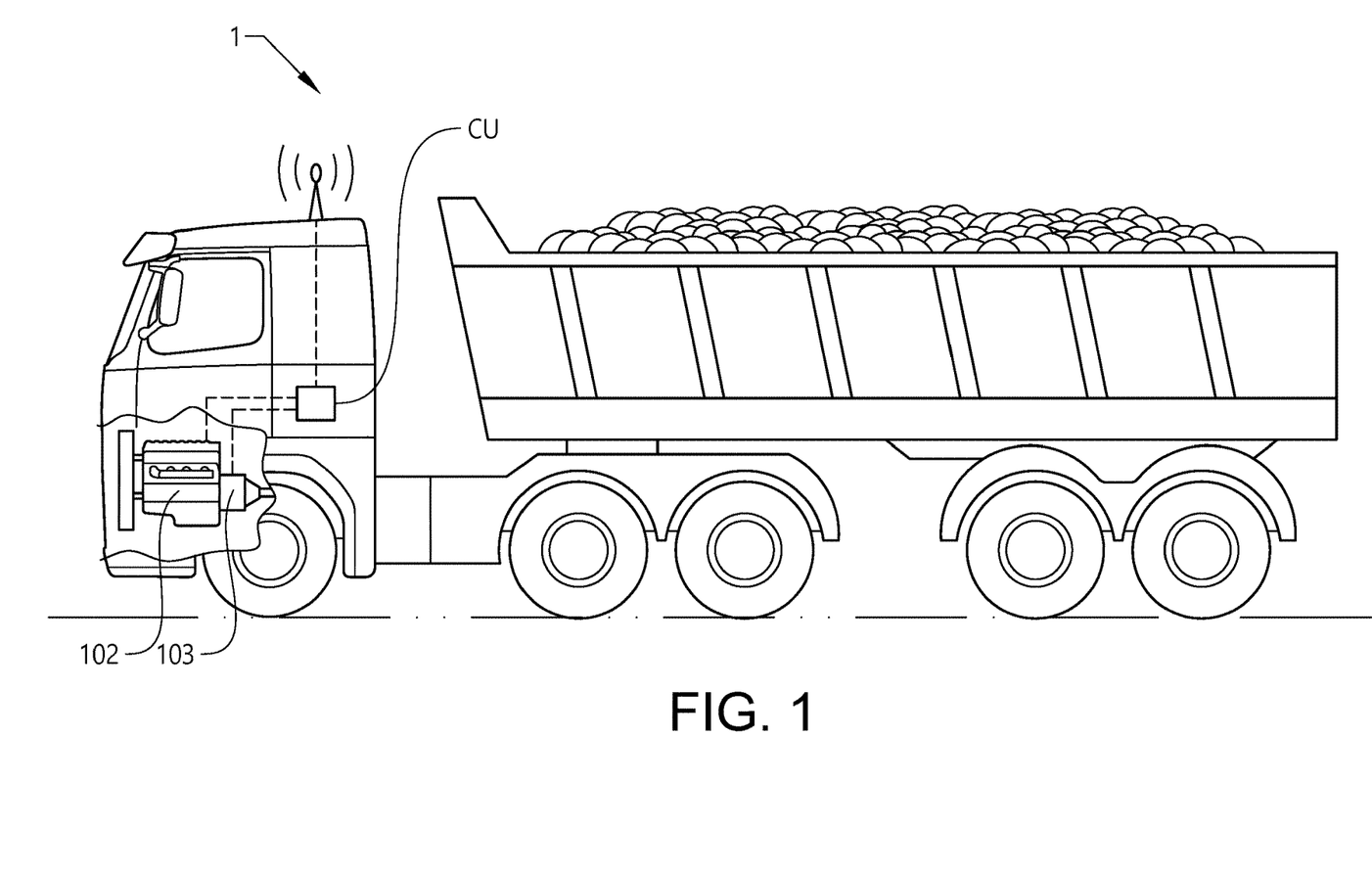
FIG. 1 shows a vehicle in the form of a truck.

FIG. 1 depicts a heavy-duty vehicle 1 in the form of a truck. The vehicle comprises a drivetrain. The drivetrain comprises a propulsion arrangement 102, 103, for the propulsion of the vehicle. The propulsion arrangement comprises an internal combustion engine 102, and a transmission 103. The engine 102 may be of any suitable kind, e.g. a diesel engine or an Otto engine. The transmission 103 is in this embodiment an automatic transmission. A control unit CU is provided to control the engine 102 and the transmission 103. It is understood that the control unit CU may be provided as a single physical unit, or as a plurality of physical units. The vehicle further comprises service brakes, and a driveline retarder, (not shown).

Figure 2:
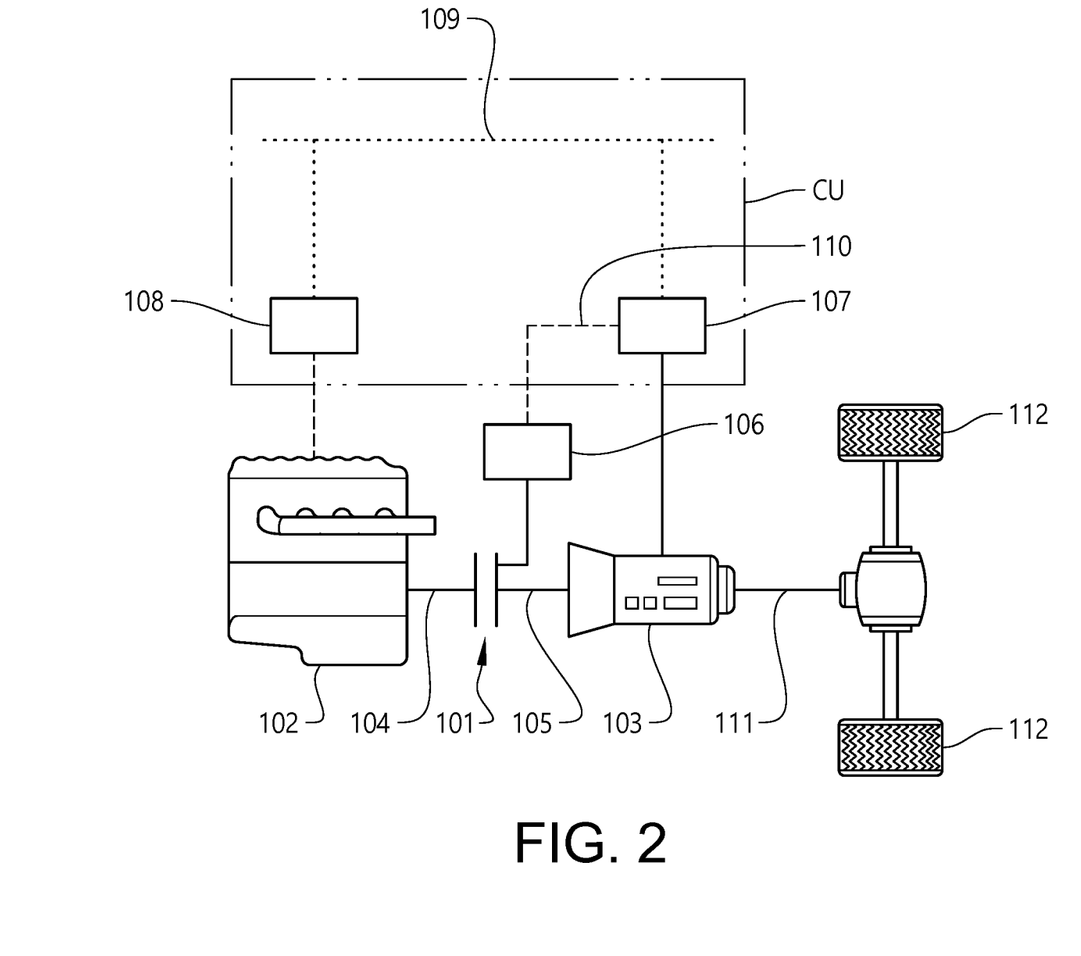
FIG. 2 shows a schematic overview of a drivetrain of the vehicle in FIG. 1.

For background information, the drivetrain will be briefly described, and reference is made also to FIG. 2. A clutch 101 is situated between the engine 102 and the transmission 103, connecting a crankshaft 104 of the engine 102 to a transmission input shaft 105 of the transmission 103 of the vehicle. A transmission output shaft 111 connects the transmission 103 with driving wheels 112 of the vehicle. The clutch 101 is controlled, e.g. mechanically, by a clutch actuator mechanism 106, in turn controlled, e.g. electronically, by a gearshift control sub-unit 107 of the control unit CU. An engine control sub-unit 108 of the control unit CU controls the engine 102. The two control sub-units 107, 108 may communicate with each other, for example via a controller area network (CAN) bus 109. Alternatively, both the engine and transmission may be controlled by a single control unit.

Figure 3:
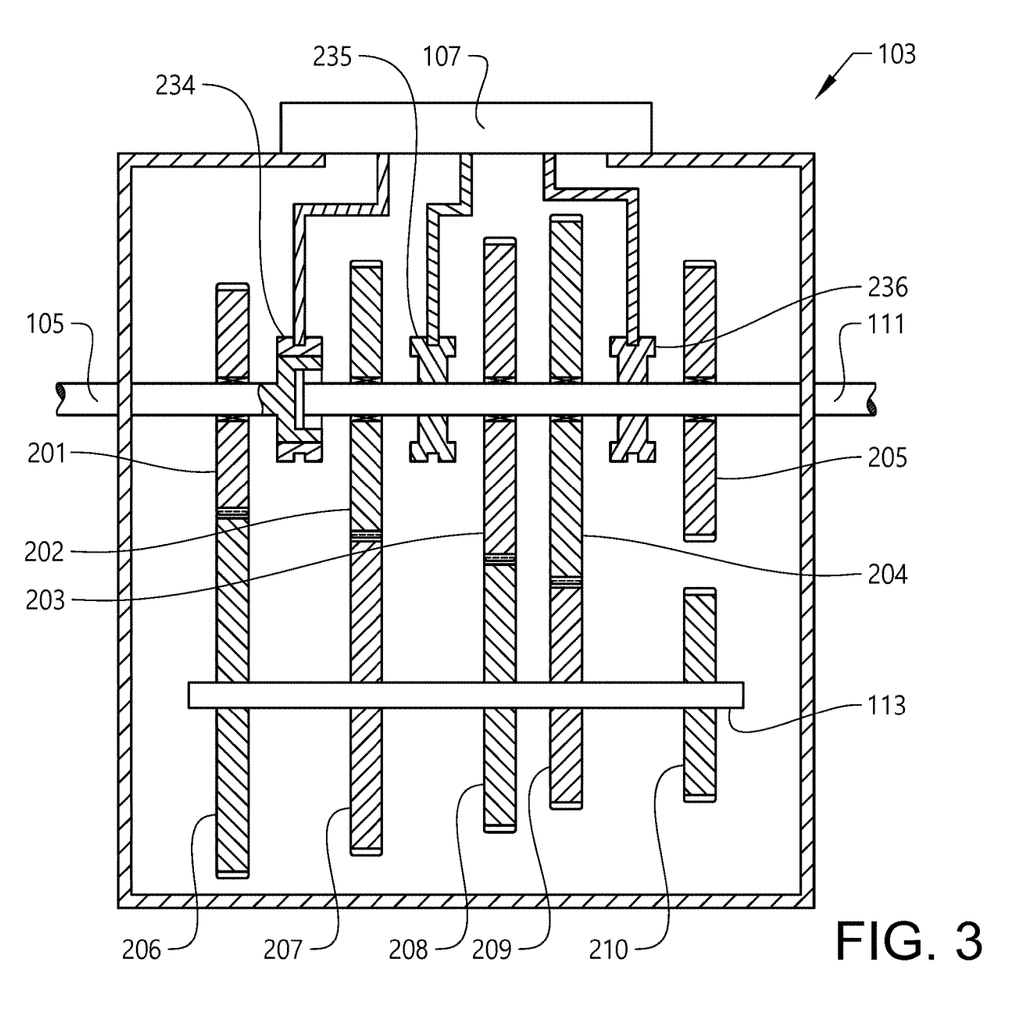
FIG. 3 shows a schematic cross-sectional view of a transmission in the drivetrain in FIG. 2.

FIG. 3 shows a schematic view of the transmission 103. The transmission output shaft 111 is arranged coaxial with the input shaft 105. The transmission input shaft 105 and transmission output shaft 111 are equipped with a plurality of gearwheels 201, 202, 203, 204, 205 which are connected to the input shaft 105 and output shaft 111 with bearings. A countershaft 113 positioned parallel with the input and output shafts 105, 111, and is equipped with a plurality of gearwheels 206, 207, 208, 209, 210 which are rotatably attached to the countershaft 113.

In FIG. 3, for simplicity of this presentation, the transmission is depicted with a relatively small number of gears. However, in method in the example described below, it is assumed that the transmission has twelve gears. It should be noted however that the transmission may have any suitable number of gears.

The gearshift control sub-unit 107 comprises a microprocessor programmed to automatically control gear control actions, including gear shift operations, of the transmission 103. The gearshift control sub-unit 107 receives input, e.g. from the engine control sub-unit and an accelerator pedal actuating position, based on which the gearshift control sub-unit 107 may select a suitable conversion ratio between the input and output shafts 105, 111. The gearshift control sub-unit 107 is adapted to control the axial position of a plurality of coupling sleeves 234, 235, 236 of the transmission. The coupling sleeves 234-236 are rotationally locked and axially displaceable to the shaft on which they are positioned. A coupling sleeve 234, 235, 236 may be located in an axial position in which it is not engaged with any gearwheel 201-205, or it may be located in an axial position in which it is engaged with a gearwheel. By such an engagement, torque may then be transmitted from the input shaft 105, to the countershaft 113 and further to the output shaft 111.

The transmission 103 is further equipped with position detection sensors, each generating an output signal corresponding to the position of an individual gearshift actuator.

Figure 4:
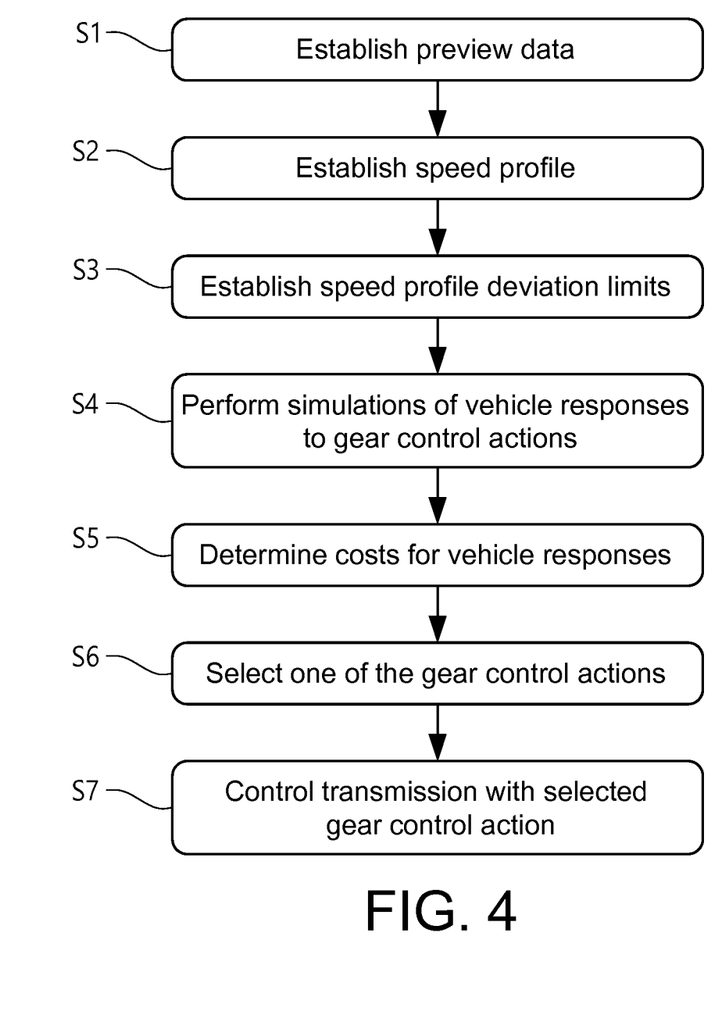
FIG. 4 is a flow diagram depicting stages in a method according to an embodiment of the invention.
Figure 5:
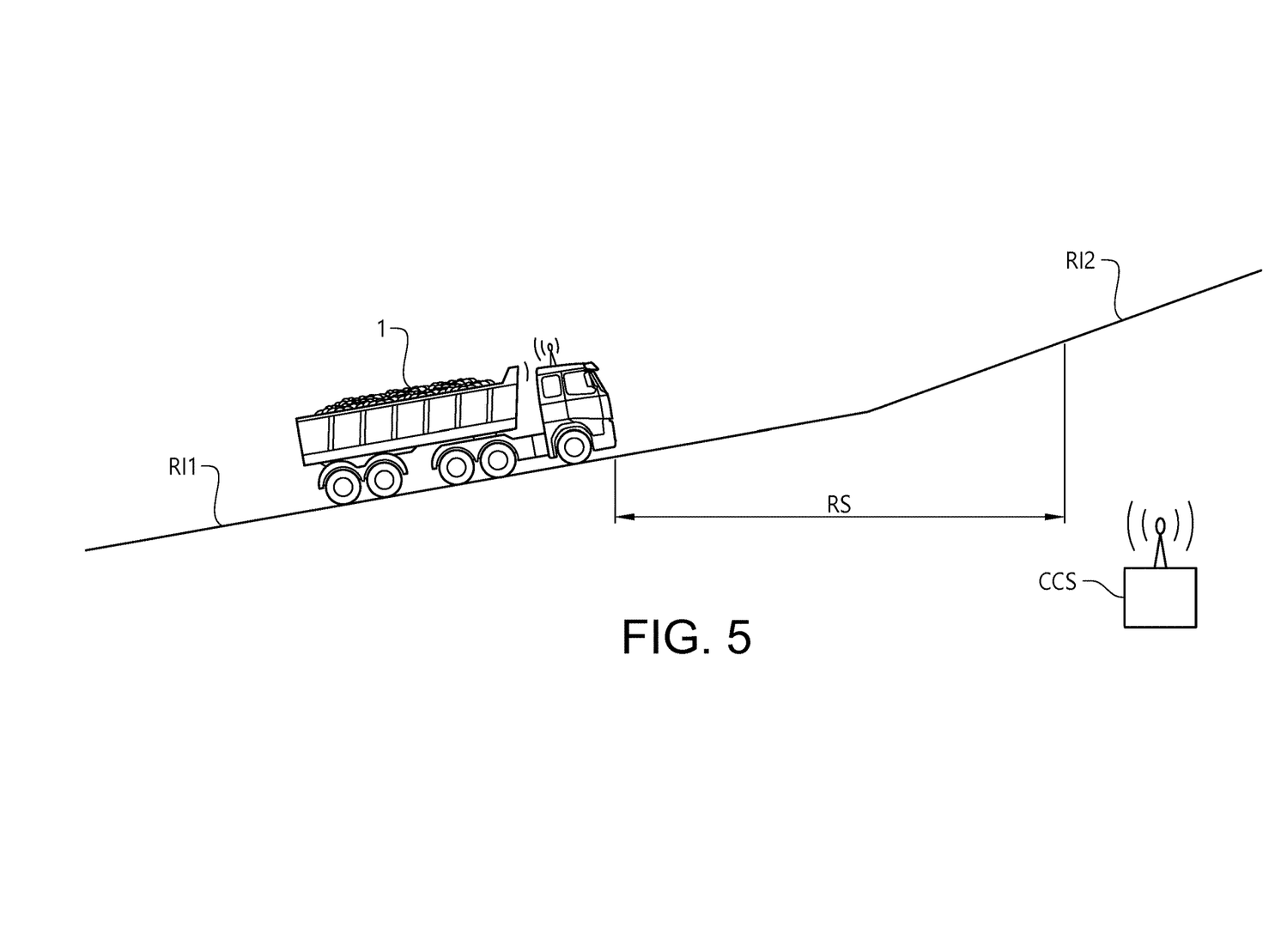
FIG. 5 shows a schematic vertical cross-section along a segment of a road travelled by the vehicle in FIG. 1.

FIG. 4. depicts steps in a method, according to an embodiment of the invention, for controlling the transmission 103. Reference is made also to FIG. 5. In this example, the method comprises establishing preview data on a plurality of segments of a road portion. A road segment may be identified as a segment of the road portion extending from the vehicle to a point at a distance ahead of the vehicle. In some embodiments, a road segment may be identified as a segment of the road portion extending from a first point ahead of the vehicle, to a second point at a distance ahead of the first point. Said distance may be predetermined. The distance may be any suitable distance, e.g. within an interval of 100-2000 meters.

As the vehicle travels along the road, repeated replacements, of a road segment with another road segment, may be performed for the simulations. The road segments used for the simulations may be overlapping. For example, a new road segment may be established within a predetermined time interval, or within a predetermined distance, e.g. 0.5-5 meters, e.g. 1 meter, of travel of the vehicle.

Each of some, or all, of the road sections may comprise parts having different road inclinations. Further, each of some, or all, of the road sections may comprise parts having different road curvatures. Curves may entail vehicle speed restrictions. In FIG. 5 an example is shown with a road segment RS comprising a first part with a first road inclination RI1, and a second part with a second road inclination RI2. Both inclinations provide uphill inclinations for the vehicle 1.

Road inclinations, and/or road curvatures, may be provided based on map data. In this example, the preview data, comprising one or more road inclinations, and/or one or more road curvatures, is established S1. The preview data may be established for each road segment RS. The preview data may be established based on map data.

The preview data may be determined by the control unit CU. In some embodiments, the preview data may be determined by a central control system CCS (FIG. 5). The preview data may be established by the vehicle control unit CU receiving the preview data wirelessly from the central control system CCS.

The preview data may be repetitively updated as the vehicle travels. Sequential sets of preview data could be provided for the repeated sets of simulations. Each set of preview data may include information on environmental conditions of a respective road segment.

A route to be travelled by the vehicle may comprise one or more roads or road portions. For a route to be travelled by the vehicle, route data may be established. The route data may comprise information about road inclinations, and/or curvatures, along the route. The preview data may be established by extracting, from the route data, information regarding a segment of a road, or a segment of a portion of the road, included in the route.

Figure 6:
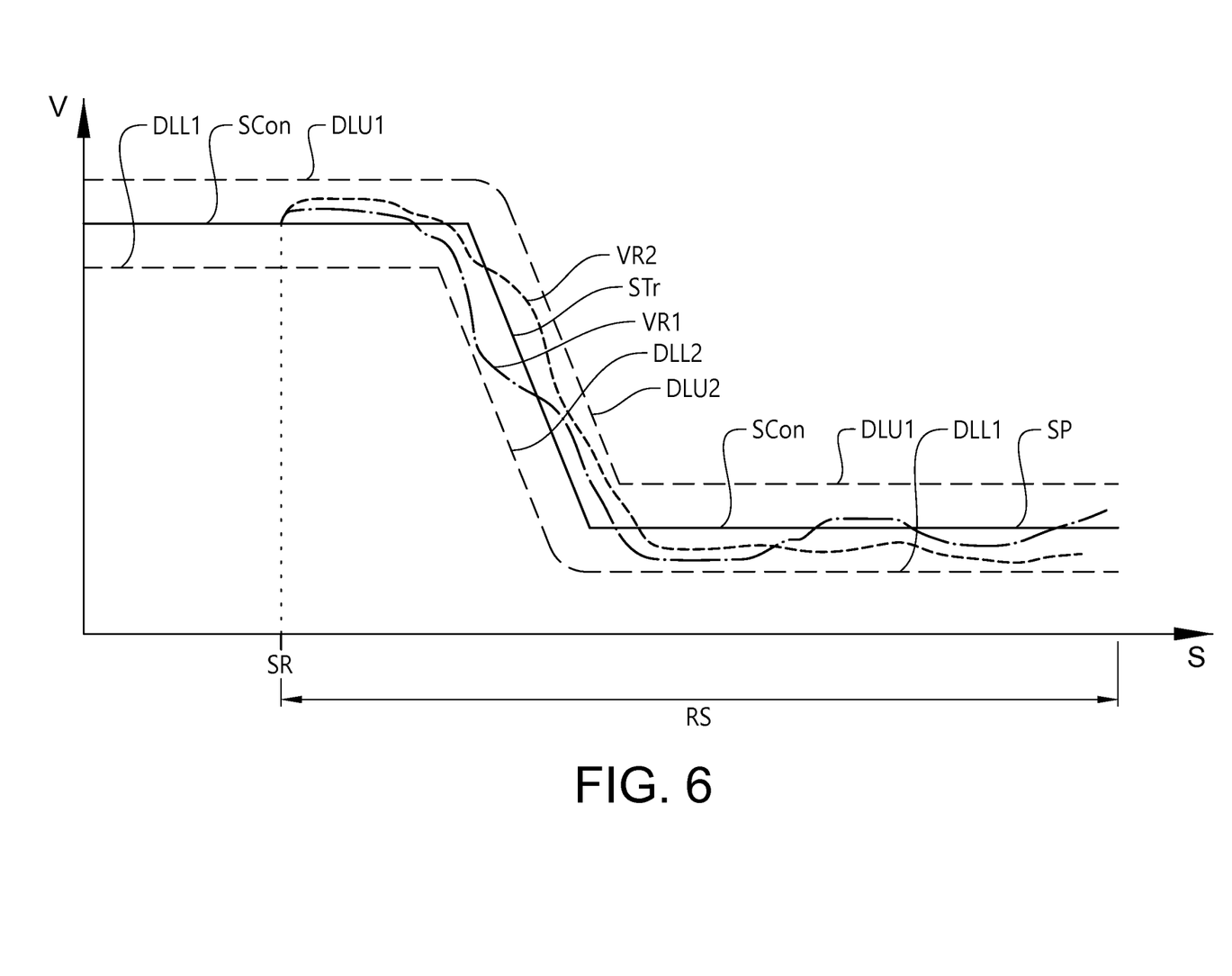
FIG. 6 shows a diagram with a speed profile for the vehicle when travelling along the segment in FIG. 5, with the vehicle speed V as a function of the horizontal distance travelled S.

Reference is made also to FIG. 6. The method comprises establishing S2 a desired speed profile SP for the vehicle when travelling along the road segment RS. The speed profile for the road segment may be a part of a speed profile for a route including the road segment. The speed profile for the route may be established before the vehicle starts travelling along the route. The speed profile for the route may be established by a recording at a previous trip along the route by the vehicle, or another vehicle. Alternatively, the speed profile is established by means of a mathematical model of the vehicle, and in dependence of environmental data on the route. The sped profile for the route may be stored in the central control system CCS. Thereby, the speed profile for the road segment may be established by the vehicle control unit CU receiving the speed profile for the route by a wireless transmission, and extracting the speed profile for the road segment from the speed profile for the route.

As can be seen in FIG. 6, the speed profile SP for the road segment RS comprises a speed transition. The speed transition is dependent on the difference in the first and second road inclinations RI1, RI2. In this example, the second road inclination RI2 provides a steeper uphill inclination for the vehicle, compared to the first road inclination RI1. Therefore, the speed transition involves a reduction of the vehicle speed. In this example, the speed profile SP in the road segment RS involves a part with a constant speed SCon, followed by a part with a decreasing speed STr, in turn followed by another part with constant speed SCon.

The method further comprises S3 establishing limits DLU1, DLU2, DLL1, DLL2 of deviations from the speed profile SP. The deviation limits DLU1, DLU2, DLL1, DLL2 are further from the speed profile SP at the speed transition STr, than at the constant speeds SCon. The deviation limits may be provided for a speed profile for a route to be travelled by the vehicle, the road segment being a segment of a road, or a road portion, of the route.

The method comprises performing S4 a plurality of simulations. Each simulation is of a response VR1, VR2 of the vehicle 1, in the road segment, to a respective gear control action. For simplicity of this presentation, only two responses VR1, VR2 are depicted in FIG. 6.

The simulations are done onboard the vehicle 1, by the control unit CU, while the vehicle is travelling. The simulations are performed by means of a mathematical vehicle model stored accessible to the control unit CU. The vehicle model includes a model of the transmission 103.

In this embodiment, the method comprises determining operational conditions of the vehicle. The operational conditions comprise values of one or more operational parameters. The simulations are performed in dependence on the operational conditions of the vehicle.

The gear control action differs from one simulation to another. In this example, the vehicle responses VR1, VR2 of the simulations include the vehicle speed V. The vehicle speed is determined by means of the vehicle model, and in dependence on the vehicle propulsive torque, the road inclinations RI1, RI2, and the vehicle acceleration.

All simulations are simulations of the vehicle response at the same location of the road segment RS. More specifically, all simulations are simulations of the vehicle response, initiated at the same location SR of the road segment RS, herein also referred to as a response location SR. The simulations may use preview data currently available. All simulations in a set of simulations may use the same preview data and the same operational conditions.

Figure 7:
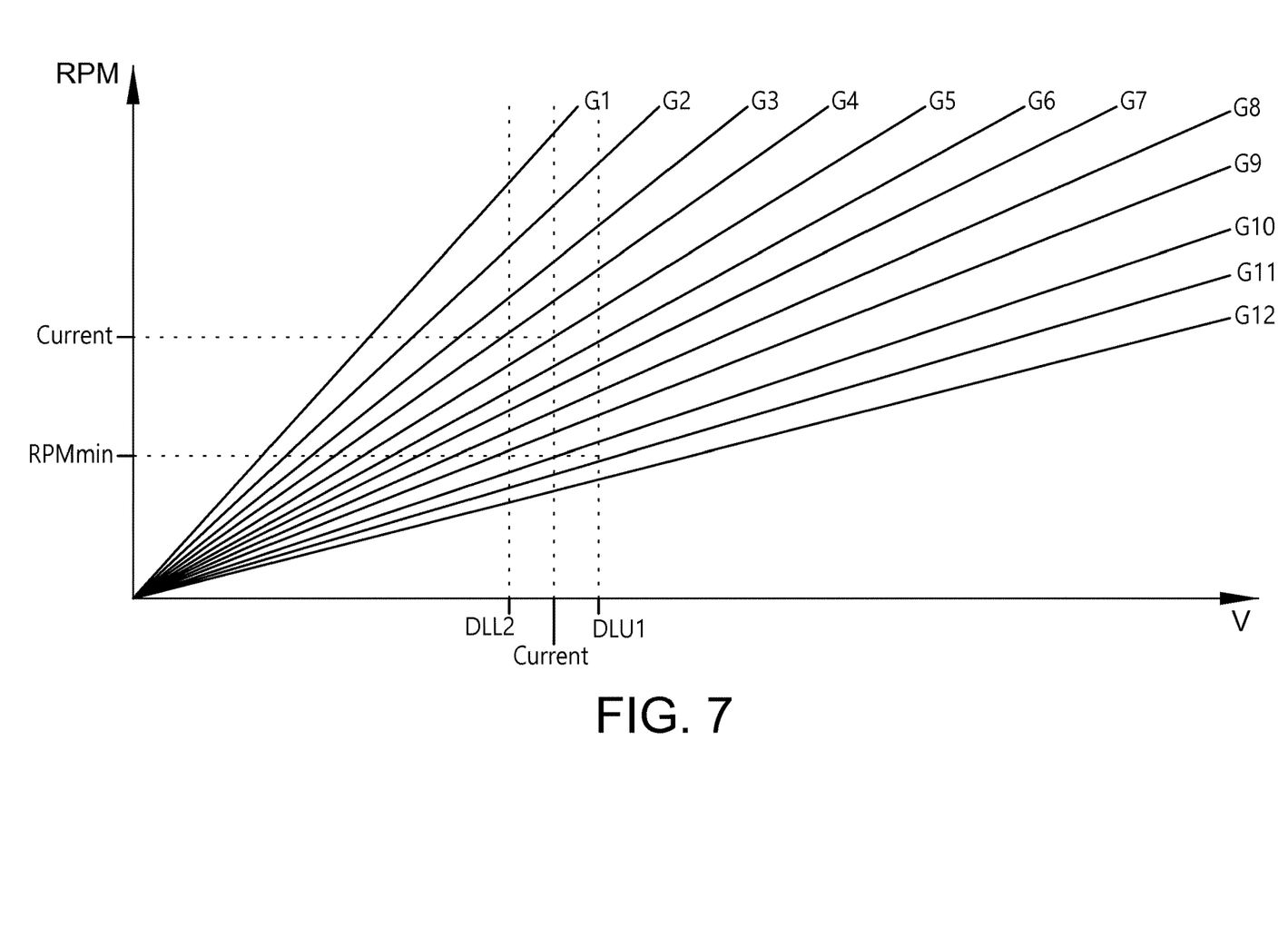
FIG. 7 shows a diagram indicating an engine speed as a function of the vehicle speed, for a plurality of gears of the transmission of the vehicle in FIG. 1.

Reference is made also to FIG. 7. As suggested, in this example, the transmission 103 has twelve forward gears G1-G12. In this example, the transmission is, when the simulations are performed, in the fifth gear G5. The gear control action of all simulations, except one, is a gearshift from the current gear G5 to another gear G1-G4, G6-G12. The other gear in the gearshift differs from one simulation to another.

The gear control action of one of the simulations is remaining in the current gear G5.

The simulations with gearshifts comprise determining vehicle dynamics during the gearshift. Such dynamics may include a vehicle deceleration due to the transmission not transferring any torque from the engine to the wheels, within a time interval during the gearshift.

The simulations S4 include an aim to keep the speed V within the speed profile deviation limits DLU1, DLU2, DLL1, DLL2. Thus, if there is an indication that the speed will be outside of any of the speed profile deviation limits, one or more control actions will be simulated to prevent the speed to go outside of the speed profile deviation limit.

The method comprises determining S5 costs for the simulated vehicle responses VR1, VR2. The cost for each simulated vehicle response VR1, VR2 is dependent on a plurality of operational parameters. In this example, these operational parameters the fuel consumption of the vehicle, a deviation from the speed profile SP, a vehicle service brake usage, an engine retarder usage, and a driveline retarder usage. The determination of the cost may include calculating an integral of the parameters. The integral may be calculated through the road section. The cost for each vehicle response VR1, VR2 is determined by weighting respective values of the operational parameters. Thereby weights are distributed to the parameters.

The method further comprises selecting S6, in dependence on the determined costs, one of the gear control actions.

An established minimum speed RPMmin of the engine is indicated in FIG. 7. The method comprises removing from the gear control action selection, a gear control action comprising a gearshift to a gear G11, G12 providing an engine speed below the minimum speed. The current speed of the vehicle may be used to determine whether a gear provides an engine speed below the minimum speed RPMmin. In this example, the method comprises avoiding a simulation of such a gear control action comprising a gearshift to a gear G11, G12 providing an engine speed below the minimum speed.

The simulations may comprise using shift points for gearshifts. A shift point may establish, for a shift from a certain gear to another certain gear, the engine speed at which the shift should take place. The shift points may be predetermined. However, in some embodiments, at least some of the simulations may comprise determining the shift point in dependence of the operational circumstances, the vehicle dynamics during the gearshift, and/or the preview data. Thereby, the shift points may be selected so as to avoid that engine speeds, which are lower than desired, occurs upon the gearshift.

The selected gear control action is the gear control action providing the vehicle response with the lowest cost. The transmission 3 is controlled S7 with the selected gear control action.

In this embodiment, the steps of performing a plurality of simulations, determining costs for the simulated vehicle responses VR1, VR2, and selecting one of the gear control actions, are done onboard the vehicle 1, while the vehicle is travelling.

The steps of performing a plurality of simulations, and determining costs for the simulated vehicle responses VR1, VR2, are repeated a plurality of times while the vehicle is travelling. Such repeating may be done within predetermined intervals of time, or distance travelled by the vehicle. For example, sets of simulations may be repeated every 50-500 ms, e.g. 200 ms. Further, as the vehicle is travelling a new road segment may be repeatedly established. Preview data on the road segments are sequentially used for sets of pluralities of simulations, and cost determinations. Each time these steps are repeated, a new set of simulations may be performed. Preferably, for each set of simulations, the operational parameter values of the operational circumstances, in dependence on which the simulations are performed, are updated. Repeated selections of gear control actions may be performed in dependence on repeated simulation sets and cost determinations. As suggested, in some examples, two, or more sets of simulations may be performed before a gear control action is selected.

Variations within the scope of the claims are possible. For example, before controlling the transmission 3 with the selected gear control action, one, more, or all, of the simulations of vehicle responses VR1, VR2 to the respective gear control actions, could be repeated, one or more times, e.g. to obtain a greater certainty in the simulations.

Figure 8:
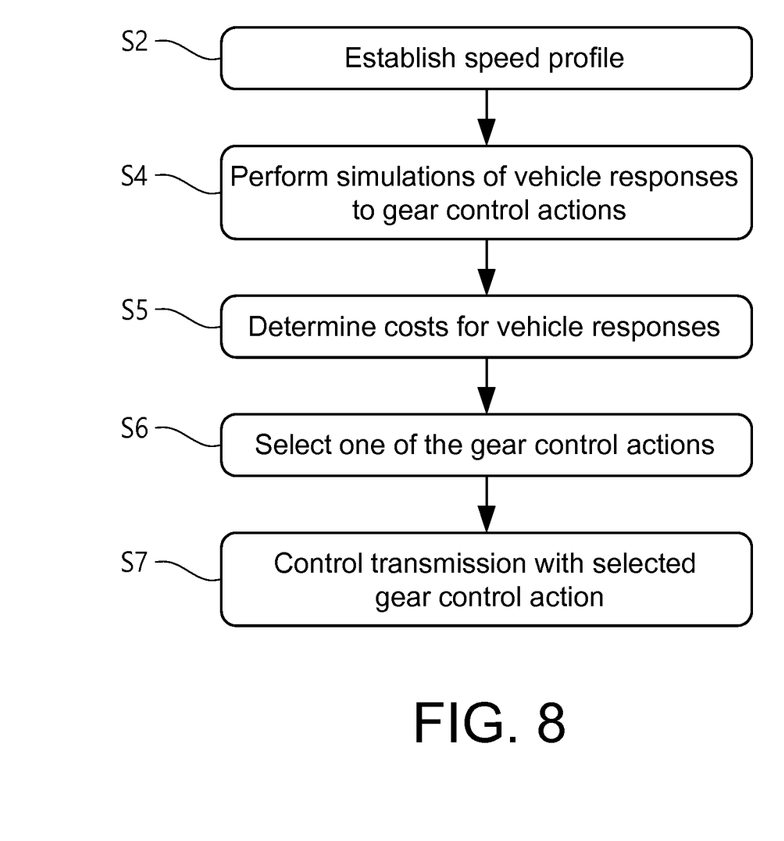
FIG. 8 is a flow diagram depicting stages in a method, according to a more general embodiment of the invention, for controlling a transmission of a vehicle.

Reference is made to FIG. 8, depicting a method, according to a more general embodiment of the invention, for controlling a transmission of a vehicle. The method comprises establishing S2 a desired speed profile for the vehicle when travelling along a road segment. The method further comprises performing S4 a plurality of simulations. Each simulation is of a vehicle response, in the road segment, to a respective gear control action. The gear control action differs from one simulation to another. The simulations include an aim to keep the speed on the speed profile, or within one or more established limits of deviations from the speed profile. The method further comprises determining S5 costs for the simulated vehicle responses. The method further comprises selecting S6, in dependence on the determined costs, one of the gear control actions. The method further comprises controlling S7 the transmission with the selected gear control action.

It is to be understood that the present invention is not limited to the embodiments described above and illustrated in the drawings; rather, the skilled person will recognize that many changes and modifications may be made within the scope of the appended claims.

The invention claimed is:

1. A method for controlling a transmission of a vehicle, the method comprising:
establishing a desired speed profile for the vehicle when travelling along a road segment, characterized by
performing a plurality of simulations, each of a vehicle response, in the road segment, to a respective gear control action, wherein the gear control action differs from one simulation to another, wherein the simulations include a condition to keep a vehicle speed on the speed profile, or within one or more established limits of deviations from the speed profile,
determining costs for the simulated vehicle responses,
selecting, in dependence on the determined costs, one of the gear control actions, and
controlling the transmission with the selected gear control action.

2. A method according to claim 1, characterized in that the speed profile comprises one or more speed transitions.

3. A method according to claim 1, characterized in that the steps of performing a plurality of simulations, determining costs for the simulated vehicle responses, and selecting one of the gear control actions, are done onboard the vehicle, while the vehicle is travelling.

4. A method according to claim 1, characterized in that the steps of performing a plurality of simulations, and determining costs for the simulated vehicle responses, are repeated a plurality of times while the vehicle is travelling.

5. A method according to claim 1, characterized in that all of said simulations are simulations of vehicle responses at the same location of the road segment.

6. A method according to claim 1, characterized in that the vehicle responses of the simulations include at least one of the vehicle speed, a vehicle acceleration, and a torque of the vehicle.

7. A method according to claim 1, characterized in that the gear control action of at least one of the simulations is a gearshift from a current gear to another gear.

8. A method according to claim 1, characterized in that the gear control action of a plurality of the simulations is a gearshift from a current gear to another gear, wherein the another gear in the gearshift differs from one simulation to another.

9. A method according to claim 1, characterized in that the gear control action of one of the simulations is remaining in a current gear.

10. A method according to claim 1, characterized in that the gear control action of one or more of the simulations is a gearshift from a current gear to another gear, followed by a further gearshift from the another gear to a further gear.

11. A method according to claim 1, wherein the vehicle comprises an internal combustion engine, characterized by establishing a minimum speed of the engine, and removing, from the gear control action selection, or deselecting, a gear control action comprising a gearshift to a gear providing an engine speed below the minimum speed.

12. A method according to claim 1, characterized in that the cost for each simulated vehicle response is dependent on one or more operational parameters selected from the group of fuel consumption of the vehicle, a deviation from the speed profile, a vehicle service brake usage, an engine retarder usage, and a driveline retarder usage.

13. A method according to claim 12, characterized in that the respective response cost is determined by weighting respective values of the one or more operational parameters.

14. A method according to claim 1, characterized by, before controlling the transmission with the selected gear control action, repeating at least one of the simulations of vehicle responses to the respective gear control actions.

15. A method according to claim 1, characterized by establishing the one or more limits of deviations from the speed profile, wherein the simulations include a condition to keep a vehicle speed within the one or more established deviation limits.

16. A method according to claim 15, characterized in that the one or more deviation limits are further from the speed profile at a speed transition, than at a constant speed.

17. A method according to claim 1, characterized by establishing preview data of the road segment, the simulations being performed in dependence on the preview data.

18. A method according to claim 1, characterized in that one or more of the simulations comprise determining vehicle dynamics during a gearshift of the respective gear control action.

19. A computer program comprising program code means for performing the steps of claim 1 when said program is run on a computer, or a group of computers.

20. A computer readable medium carrying a computer program comprising program code means for performing the steps of claim 1 when said program product is run on a computer, or a group of computers.

21. A control unit configured to perform the steps of the method according to claim 1.

22. A vehicle comprising a control unit according to claim 21.

* * * * *